United States Patent
Haben

(10) Patent No.: US 11,897,766 B2
(45) Date of Patent: Feb. 13, 2024

(54) METHOD FOR PRODUCING COPPER-SELENIDE NANOPARTICLES, AGGREGATED BODIES OF COPPER-SELENIDE NANOPARTICLES, COPPER-SELENIDE NANOPARTICLES, AND FILM-COATED STRUCTURE

(71) Applicant: SHOEI CHEMICAL INC., Tokyo (JP)

(72) Inventor: Patrick Haben, Corvallis, OR (US)

(73) Assignee: SHOEI CHEMICAL INC., Tokyo (JP)

( * ) Notice: Subject to any disclaimer, the term of this patent is extended or adjusted under 35 U.S.C. 154(b) by 0 days.

(21) Appl. No.: 17/980,209

(22) Filed: Nov. 3, 2022

(65) Prior Publication Data
US 2023/0065394 A1 Mar. 2, 2023

Related U.S. Application Data

(62) Division of application No. 17/039,472, filed on Sep. 30, 2020, now Pat. No. 11,517,963.
(Continued)

(51) Int. Cl.
*C01B 19/04* (2006.01)
*C01B 19/00* (2006.01)
(Continued)

(52) U.S. Cl.
CPC ............ *C01B 19/007* (2013.01); *B22F 1/054* (2022.01); *B22F 1/16* (2022.01); *B22F 9/24* (2013.01); *B22F 2301/10* (2013.01); *B22F 2301/20* (2013.01); *B22F 2304/05* (2013.01); *B82Y 30/00* (2013.01); *B82Y 40/00* (2013.01)

(58) Field of Classification Search
None
See application file for complete search history.

(56) References Cited

U.S. PATENT DOCUMENTS

| 2010/0003187 A1* | 1/2010 | Guo | C01G 1/02 423/508 |
| 2014/0255604 A1* | 9/2014 | Hens | B05D 7/24 427/213.32 |
| 2015/0024543 A1* | 1/2015 | Harris | H01L 31/0322 252/519.4 |

FOREIGN PATENT DOCUMENTS

CN 106252433 A * 12/2016

OTHER PUBLICATIONS

Dorfs, D. et al., "Reversible Tunability of the Near-Infrared Valence Band Plasmon Resonance in Cu2-xSe Nanocrystals", Journal of the American Chemical Society, Jul. 6, 2011, pp. 11175-11180.*
(Continued)

*Primary Examiner* — George Wyszomierski
(74) *Attorney, Agent, or Firm* — Alleman Hall & Tuttle LLP

(57) ABSTRACT

In a method for producing nanoparticles of copper selenide, a flowable copper precursor is formed by combining a copper starting material and a ligand, and a flowable selenium precursor is formed by suspending a selenium starting material in a liquid. Then a flowable copper-selenium mixture including a lower-polarity solvent is formed by combining the flowable copper precursor and the flowable selenium precursor. The flowable copper-selenium mixture is conducted through at least one heating unit, and the nanoparticles of copper selenide are isolated in an oxygen-depleted environment. The isolation includes combining a solution containing the nanoparticles of copper selenide and a deoxygenated, higher-polarity solvent to precipitate the nanoparticles.

8 Claims, 9 Drawing Sheets

Related U.S. Application Data

(60) Provisional application No. 62/908,476, filed on Sep. 30, 2019.

(51) Int. Cl.
| | | |
|---|---|---|
| *B22F 9/24* | (2006.01) | |
| *B22F 1/16* | (2022.01) | |
| *B22F 1/054* | (2022.01) | |
| B82Y 30/00 | (2011.01) | |
| B82Y 40/00 | (2011.01) | |

(56) References Cited

OTHER PUBLICATIONS

English translation of CN 106252433 (originally published Dec. 21, 2016), obtained from PE2E search.*

* cited by examiner

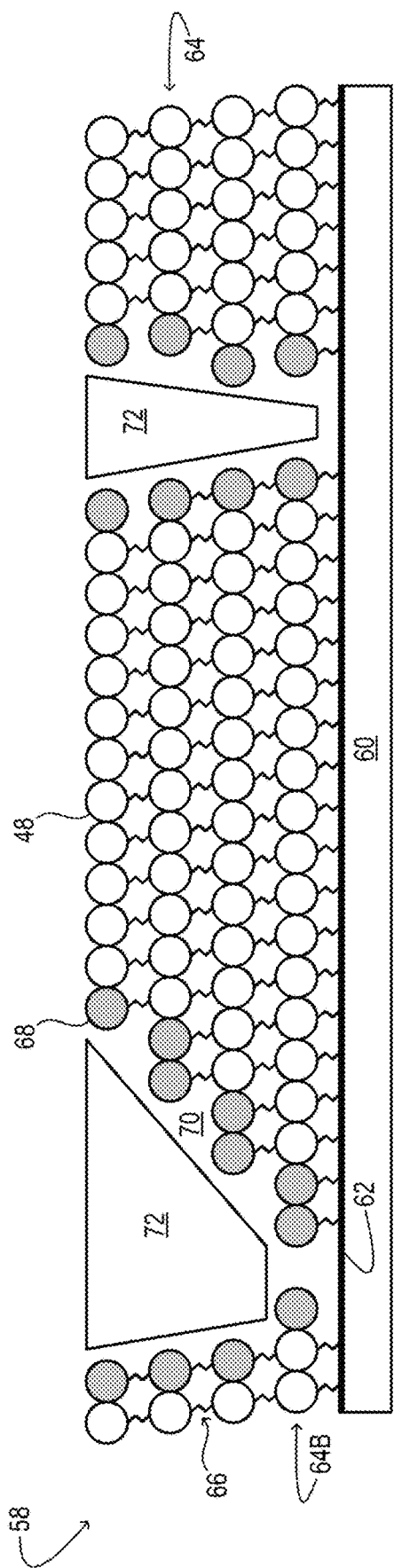

METHOD FOR PRODUCING COPPER-SELENIDE NANOPARTICLES, AGGREGATED BODIES OF COPPER-SELENIDE NANOPARTICLES, COPPER-SELENIDE NANOPARTICLES, AND FILM-COATED STRUCTURE

CROSS-REFERENCE TO RELATED APPLICATION

The present application is a divisional of U.S. patent application Ser. No. 17/039,472, filed Sep. 30, 2020, and entitled METHOD FOR PRODUCING COPPER-SELENIDE NANOPARTICLES, AGGREGATED BODIES OF COPPER-SELENIDE NANOPARTICLES, COPPER-SELENIDE NANOPARTICLES, AND FILM-COATED STRUCTURE, which in turn claims priority to U.S. Provisional Application No. 62/908,476 filed Sep. 30, 2019, the entire disclosures of each being hereby incorporated by reference in their entireties for all purposes.

TECHNICAL FIELD

The present invention relates to method for producing copper-selenide nanoparticles, aggregated bodies of copper-selenide nanoparticles, copper-selenide nanoparticles, and film-coated structure.

BACKGROUND ART

A quantum dot is a semiconductor nanoparticle or crystallite small enough to show evidence of quantum confinement. In the quantum-confinement size regime, the crystallite's small dimensions spatially confine the excitons generated therein. Various optical properties of a quantum dot are size-dependent, therefore, and tunable provided that quantum dots of the desired size can be isolated. This property is exploited in technologies leveraging quantum-dot photoemission—e.g., light-emitting diodes for display, lighting, and lasing—as well as technologies leveraging optical absorption and photoinduced charge-carrier transport, such as photon detection and photovoltaics. The optical tunability of quantum dots also may be exploited in specialized electro-optical materials and components, such as down-shifting color-conversion sheets.

In recent years, quantum dots have also attracted attentions as a material for near-infrared photodetectors. However, the materials capable of absorbing energy at wavelengths in the near infrared region are limited. Si is probably one of the most well-known materials, but it can only detect wavelengths up to 900 nm. Ge can observe wavelengths from 400 nm to 1700 nm, but Ge is expensive and difficult to manufacture. Although InGaAs, PbS, and HgCdTe can detect various IR wavelengths, these materials have problems that they contain toxic elements and are expensive to manufacture. Therefore, there is a need for low-cost photodetector materials that do not contain RoHS-restricted substances.

As low-cost IR photodetector materials, $CuInSe_2$ has been studied so far. Although this material can absorb wavelengths of near-infrared (NIR), it generally has a weak absorption and the absorption often involves light emission, which is an undesirable property for photodetectors. On the other hand, copper-selenide nanoparticles (including various forms and stoichiometric imbalances referred to here as copper-selenide nanoparticles) are inexpensive, have a high carrier density, and can strongly absorb light having wavelengths in the near infrared region, which makes copper-selenide nanoparticles very promising as an IR photodetector material (Non-Patent Literature 1 to 3). However, this material has some shortcomings. This material is so sensitive to stoichiometry that it is difficult to synthesize. That is, it is difficult to make a uniform morphology with a single sample, and it is necessary to perform very strict control over the reaction. As disclosed in Non-Patent Literature 4 to 5, although copper-selenide nanoparticles with a strong IR absorption peak have been obtained by lab-scale production, it is difficult to synthesize high-quality copper-selenide nanoparticles when attempting to scale up the production volume due to overall difficulties described above, limiting their adoption in the commercial market.

CITATION LIST

Non-Patent Literature

[NPLT 1] Dorfs, D.; et al. J. Am. Chem. Soc. 2011, 133, 11175
[NPLT 2] Kriegel, I.; et al. J. Am. Chem. Soc. 2012, 134, 1583
[NPLT 3] Luther, J.; Alivisatos, P.; et al. Nature Materials 2011, 10, 361
[NPLT 4] Scotognella, F.; et al. Nano Lett. 2011, 11, 4711
[NPLT 5] Hessel, C.; et al. Nano Lett. 2011, 11(6), 2560

SUMMARY OF INVENTION

Technical Problem

It is an object of the present invention to provide a method for producing copper-selenide nanoparticles that makes possible a mass-production of copper-selenide nanoparticles that strongly absorb light having a wavelength in the near-infrared region and have a small half width at half maximum of the absorption peak, and to provide aggregated bodies of copper-selenide nanoparticles, copper-selenide nanoparticles, and film-coated structure obtained thereby.

Solution to the Problem

The method for producing a copper-selenide nanoparticles according to an embodiment of the present invention is a method for producing copper-selenide nanoparticles by flow process, the method comprising:
  forming a flowable copper precursor by combining a copper starting material and a ligand;
  forming a flowable selenium precursor by suspending a selenium starting material in a liquid;
  forming a flowable copper-selenium mixture by combining the flowable copper precursor and the flowable selenium precursor, the flowable copper-selenium mixture including a lower-polarity solvent;
  forming a solution containing copper-selenide nanoparticles by conducting the flowable copper-selenium mixture through at least one heating unit; and
  isolating the nanoparticles of copper selenide in an oxygen-depleted environment, including combining the flowable copper-selenium mixture and a deoxygenated, higher-polarity solvent to precipitate the nanoparticles of copper selenide, the higher-polarity solvent being more polar than the lower-polarity solvent.

The aggregated bodies of copper-selenide nanoparticles according to an embodiment of the present invention is an air-stable aggregated bodies of copper-selenide nanoparticles comprise copper-selenide nanoparticles which are encapsulated by a ligand, and exhibit an exciton absorption with an absorbance maximum between 900 and 1200 nanometers.

The copper-selenide nanoparticles according to an embodiment of the present invention are copper-selenide nanoparticles having an absorbance maximum between 900 and 1200 nanometers and the absorbance maximum has a peak-to-valley ratio of 10 or greater.

The film-coated structure according to an embodiment of the present invention comprises the copper-selenide nanoparticles according to the embodiment of the present invention described above.

BRIEF DESCRIPTION OF THE DRAWINGS

FIG. 7 shows aspects of an example film-coated structure that may be assembled using the copper-selenide nanoparticles prepared according to the method of FIG. 2.

ADVANTAGEOUS EFFECTS OF THE INVENTION

Figure 1:
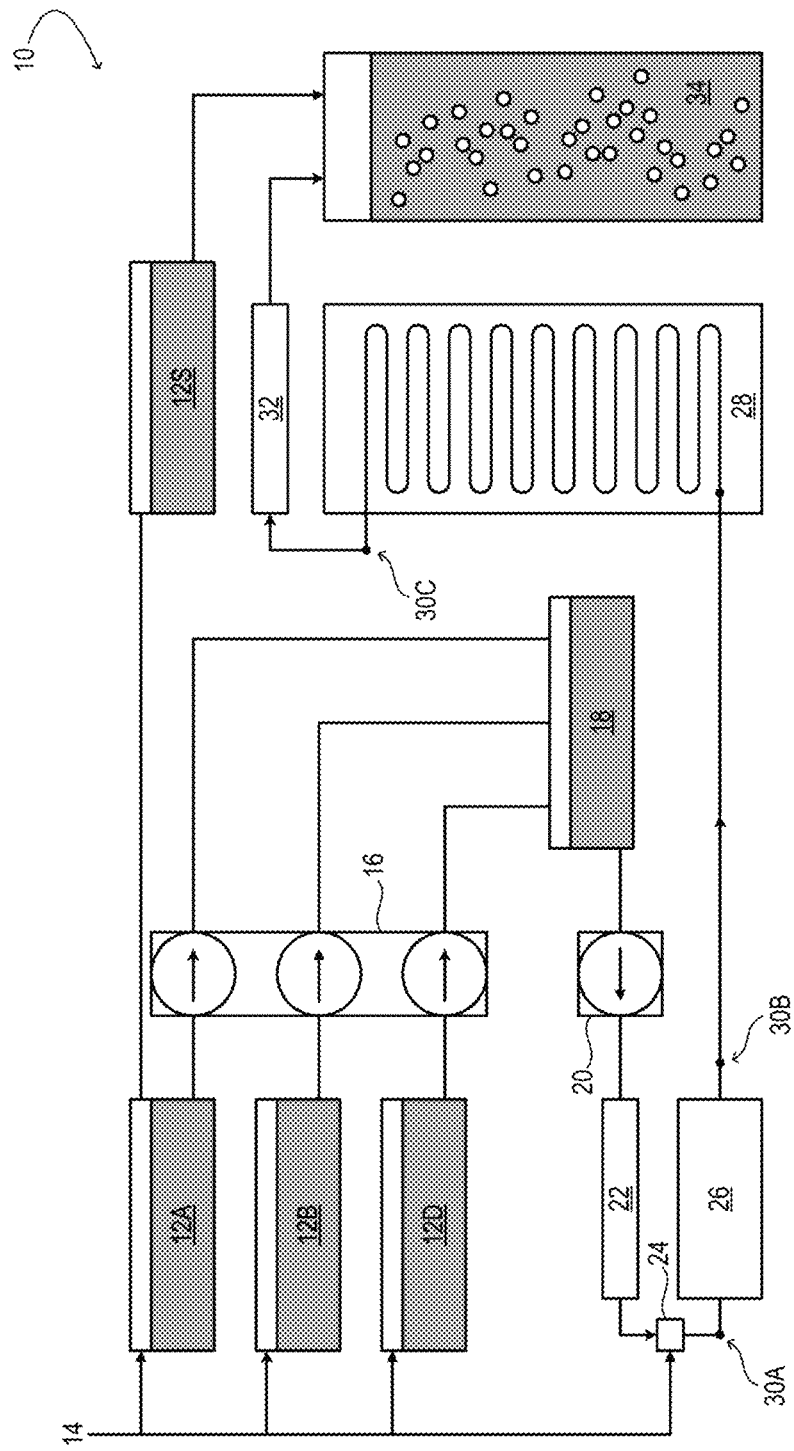
FIG. 1 shows aspects of an example continuous segmented flow reactor system.

The present invention allows to provide a method for producing copper-selenide nanoparticles that makes possible a mass-production of copper-selenide nanoparticles that strongly absorb light having a wavelength in the near-infrared region and have a small half width at half maximum of the absorption peak, and to provide aggregated bodies of copper-selenide nanoparticles, copper-selenide nanoparticles, and film-coated structure obtained thereby.

DESCRIPTION OF EMBODIMENTS

In the present application, examples are disclosed that relate to preparing nanoparticles of copper selenide ($Cu_{2-x}Se$). In one example, a flowable copper precursor is formed by combining a copper starting material and a ligand; a flowable selenium precursor is formed by suspending a selenium starting material in a liquid. Then, a flowable copper-selenium mixture including a lower-polarity solvent is formed by combining the flowable copper precursor and the flowable selenium precursor. The flowable copper-selenium mixture is conducted through at least one heating unit for forming a solution containing copper-selenide nanoparticles, and the nanoparticles of copper selenide are isolated in an oxygen-depleted environment. The isolation includes combining the solution containing copper-selenide nanoparticles and a deoxygenated, higher-polarity solvent to precipitate the nanoparticles.

Another example provides an air-stable aggregated bodies comprising copper-selenide nanoparticles prepared via a flow process and precipitated from solution under anaerobic conditions. The copper-selenide nanoparticles are encapsulated by a ligand and exhibit an exciton absorption with an absorbance maximum between 900 and 1200 nanometers.

Another example provides copper-selenide nanoparticles having an absorbance maximum between 900 and 1200 nanometers and the absorbance maximum has a peak-to-valley ratio of 10 or greater.

Another example provides an electronically conductive substrate and a plurality of layers of two-dimensionally close-packed copper-selenide nanoparticles arranged on the electronically conductive substrate. The plurality of layers includes a ligand bridging adjacent layers of the plurality of layers and bridging at least one of the plurality of layers to the electronically conductive substrate.

The Summary above is provided in order to introduce in simplified form a selection of concepts that are further described in the Detailed Description. The Summary is not intended to identify key features or essential features of the claimed subject matter, nor is it intended to be used to limit the scope of the claimed subject matter.

Semiconductor nanoparticles, or 'quantum dots', can be prepared by traditional batch processing. Batch processing in heterogeneous reaction systems is difficult to scale, however, and typically results in broad particle-size distributions. As the useful optical properties of quantum dots are dependent on particle size, synthetic methods yielding narrow particle-size distributions are generally desirable.

Continuous-flow processing offers advantages in particle-size dispersity as well as scalability. A continuous-flow reactor system may include one or more reaction zones—e.g., zones of controlled temperature, controlled irradiation, controlled exposure to a catalyst, etc. For a kinetically controlled process occurring in a reaction zone, the extent of reaction is determined by the residence time of the flowing reactant in that zone. However, a reactant flowing through a conduit, even at a constant flow rate, exhibits a distribution of velocities in the wall-normal direction. As a result, residence times are not uniform for a given flow rate, but follow a distribution. Variable residence times for reactant species may give rise to kinetically controlled products having variable chemical composition and/or physical properties—such as particle size and morphology—which may be undesirable.

Improvement in the particle-size dispersity is achievable, however, via continuous segmented flow processing. In this approach, segments of a flowing reactant are separated by intervening segments of a non-reacting fluid immiscible with the reactant. Confined to relatively short, flowing segments, the reactant exhibits a tighter distribution of residence times in the various reaction zones, resulting in a more uniform distribution of kinetically controlled products.

As described in greater detail herein, continuous segmented flow processing can be used to make ligand-encapsulated copper-selenide quantum dots of high purity and monodispersity. Precipitated from fluid solution under anaerobic conditions, the copper-selenide quantum dots exhibit a strong exciton absorption with an absorbance maximum between 900 and 1200 nanometers (nm), depending on the desired crystallite size. In more particular examples, the absorbance maximum may lie between 940 and 1100 nm. These quantum dots can be used, inter alia, to create a film-coated electrode structure usable as a near-infrared (NIR) photodetector.

This disclosure will now be presented by way of example and with reference to the drawing figures listed above. Components, process steps, and other elements that may be substantially the same in one or more of the figures are identified coordinately and described with minimal repetition. It will be noted, however, that elements identified coordinately may also differ to some degree. It will be further noted that the figures are schematic and generally not drawn to scale. Rather, the various drawing scales, aspect ratios, and numbers of components shown in the figures may be purposely distorted to make certain features or relationships easier to see.

FIG. 1 shows aspects of an example continuous segmented flow reactor system 10. The reactor system is suitable for making semiconductor nanoparticles, such as copper-selenide quantum dots.

Reactor system 10 includes precursor reservoir 12A, precursor reservoir 12B, and diluent reservoir 12D. In examples related to copper-selenide quantum-dot synthesis, precursor reservoir 12A may include a flowable solution and/or suspension of a suitable copper starting material, and precursor reservoir 12B may include a flowable solution and/or suspension of a suitable selenium starting material. Diluent reservoir 12D may include any suitable diluent mixture, such as a mixture of the liquids used to dissolve or suspend the copper and/or selenium starting materials. In some examples, the contents of precursor reservoirs 12A and 12B and/or diluent reservoir 12D are maintained under a non-reacting atmosphere, such as an atmosphere of nitrogen, argon, or helium. In some examples, a reservoir may include a gas-dispersion unit configured to emit bubbles of a non-reacting gas 14 into the solution or suspension contained therein. In this manner, the contents of any, some, or all of the reservoirs may be actively deoxygenated and maintained under a blanket of the non-reacting atmosphere.

Reactor system 10 includes a multi-channel pump 16 configured to draw the contents of precursor reservoirs 12A and 12B and of diluent reservoir 12D into premix vessel 18. The multi-channel pump may draw the contents of each of the reservoirs at a controlled volumetric rate based on the configuration and/or settings of the multi-channel pump. In some examples, the multi-channel pump may be a peristaltic pump with a common rotor driving each channel. A plurality of single-channel pumps may be used in the alternative. Premix vessel 18 is a vessel in which the flowable solutions and/or suspensions are homogenized to form a flowable reactant mixture. The premix vessel may include a mechanical or magnetic stir bar or stir vane, in some examples. In other examples, the flowable solutions may be homogenized in-line, for example, via a t-joint and mixing stage downstream of the t-joint.

Reactor system 10 includes a single-channel or other pump 20 configured to draw the contents of premix vessel 18 into an optional preheater 22. The single-channel pump may be a gear pump in some examples. The preheater may be configured to preheat the discharge from the single-channel pump to a desired temperature. To that end, the preheater may include a heating tape or heating wire wound around the conduit carrying the discharge from the single-channel pump. In the example shown in FIG. 1, this conduit leads to segmentation unit 24, where each controlled-length segment of the discharge from the single-channel pump is interrupted by a bubble of non-reacting gas 14. In this manner, a segmented flow of the preheated reactant mixture is formed.

Reactor system 10 includes an optional microwave unit 26 that receives the segmented flow and exposes the segmented flow to microwave radiation. In some though not all implementations, exposure to microwave radiation may nucleate the growth of the nanoparticles in the flowing reactant mixture. From microwave unit 26 (or from segmentation unit 24 in examples in which the microwave unit is omitted), the segmented flow is conducted into a flow heater 28, where the copper-selenide nanoparticles are grown to a desired particle-size distribution. The flow heater may be configured to provide controlled (e.g., constant-temperature) heating of the flowing reactant over a predetermined period of time, which, in general, is a function of the flow rate and of the length of the conduit arranged within the flow heater. In some examples, the flow heater may include a conduit of appreciable length arranged in a serpentine or helical configuration, or the like, in order to reduce the overall volume of the space that is to be maintained at the controlled temperature. In some examples, accordingly, the flow heater may include a conduit immersed in a controlled-temperature liquid bath or routed through a controlled-temperature block. In other examples, the flow heater may comprise a conduit arranged in a forced-air oven of controlled temperature.

In some examples, reactor system 10 may include a temperature controller (not shown in the drawings) configured to control the heating power applied by any of the various heating units of the reactor system—e.g., preheater 22 and microwave unit 26, if included. The temperature controller may also control the setpoint temperature of flow heater 28. Input to the temperature controller is provided via temperature sensors 30A, 30B, 30C, arranged fluidically downstream of segmentation unit 24, microwave unit 26, and flow heater 28, respectively. In this manner, the temperature controller may exert closed-loop control over the heating power delivered to the various stages of the reactor system. It will be noted, however, that alternative temperature-control strategies may also be used.

Reactor system 10 includes a cooler 32 configured to rapidly cool the segmented product flow emerging from flow heater 28. The cooling stops the growth of the copper-selenide nanoparticles and facilitates subsequent collection. The cooler may include a heat exchanger where heat from the flowing product is transferred to chilled or ambient-temperature water, for example. From the cooler, the product flows to collection unit 34. In the collection unit, the flowing product is added to an excess amount of a deoxygenated liquid in which the product is not soluble, but which is miscible with the solvent system in which the product is dissolved. This action causes the nanoparticle product to precipitate in aggregated bodies i.e. solid form. Accordingly, the collection unit may include a filter or centrifuge configured to separate and thereby collect the aggregated bodies i.e. solid product from the deoxygenated liquid. In some examples, the filtered or centrifuged aggregated bodies i.e. solid product may be rinsed with additional deoxygenated liquid prior to final collection. In some examples, the deoxygenated liquid may comprise a relatively polar solvent that has been sparged in solvent reservoir 12S—by nitrogen, argon, or helium, for instance—to remove dissolved oxygen.

Figure 2:
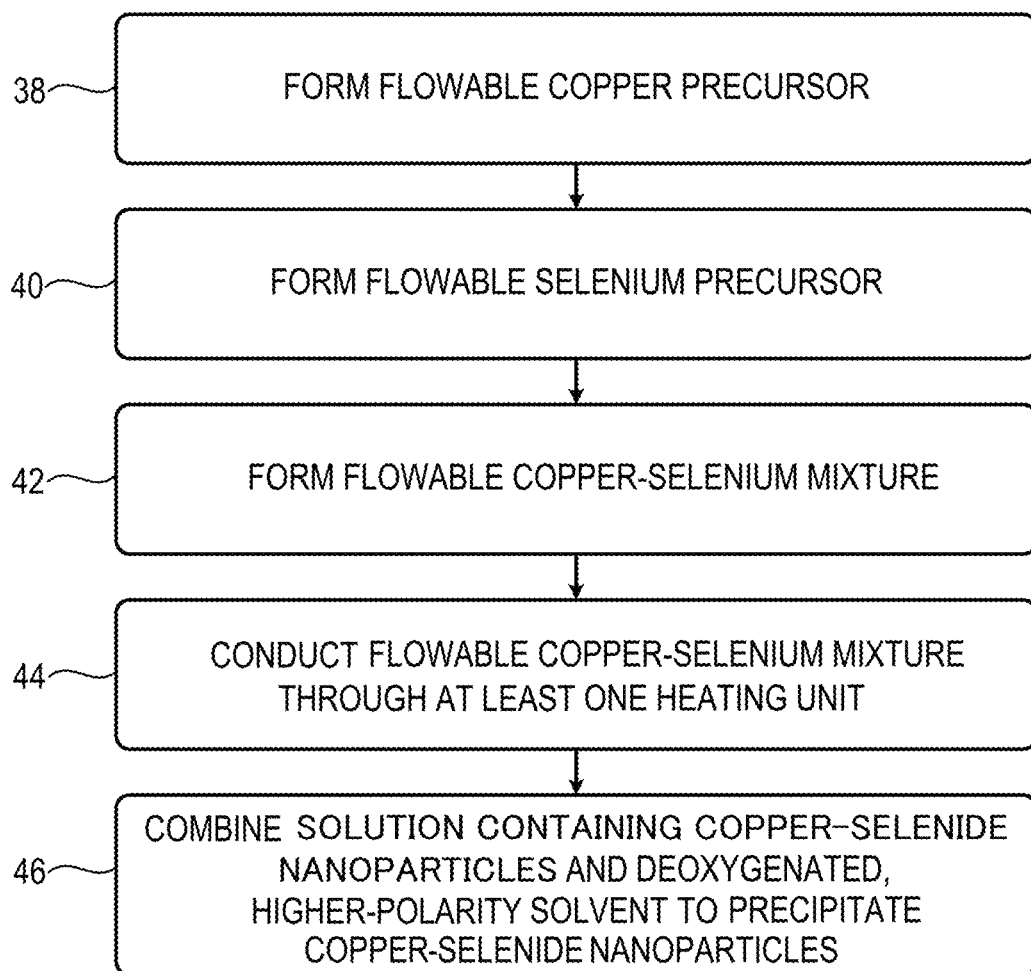
FIG. 2 illustrates an example method for preparing copper-selenide nanoparticles.

FIG. 2 illustrates an example process 36 for preparing air-stable, ligand-encapsulated copper-selenide nanoparticles. In some examples, the method may be enacted using a continuous segmented flow reactor system as described above. It will be understood, however, that other reactor systems may also be used for the process.

At 38 of process 36, a flowable copper precursor is formed as a solution or suspension of a suitable copper starting material. The flowable copper precursor may be formed by combining the copper starting material, a ligand, and, optionally, a solvent. The copper starting material may be a simple or complex salt of monovalent copper. In some examples, the copper starting material may include substantially anhydrous copper(I) chloride. In other non-limiting examples, the copper starting material may include substantially anhydrous copper(I) bromide or copper(I) acetate. The ligand may be an organic compound capable of coordinating monovalent copper to form a soluble complex ion. The ligand may also be capable of binding to the exterior of the copper-selenide nanoparticle product of process 36, thereby encapsulating each nanoparticle in an organized lipid layer. Encapsulation stabilizes the nanoparticles after synthesis, effectively 'locking in' the particle-size distribution of the product. Nevertheless, the ligand may, in some examples, bind exchangeably to the nanoparticle product, such that a ligand molecule with greater affinity for the nanoparticle product may displace any, some, or all of the ligands incorporated during synthesis. The ligand-exchange strategy may be used (vide infra) to prepare structures of copper-selenide nanoparticles for various applications.

Continuing in process 36, the ligand may comprise an amine having at least one relatively long-chain (>10 carbon atom) aliphatic substituent, although other types of ligands are also envisaged. The ligand may comprise oleylamine in some examples. When the ligand is an amine ligand, a complex can be formed in the flowable copper-selenium mixture described later, thereby contributing to the formation of uniform copper-selenide nanoparticles. The solvent, when included, may be any relatively high-boiling solvent (b.p. >250° C.) capable of dissolving lipophilic, ligand-encapsulated copper-selenide nanoparticles. Examples include nonpolar solvents and solvents of relatively low polarity, such as hydrocarbons. By using a relatively low-polarity solvent, a good compatibility with the precursor and the ligand can be obtained, thereby contributing to the formation of more uniform copper-selenide nanoparticles. The solvent may comprise 1-octadecene in some examples. In some examples, the flowable copper precursor may be deoxygenated by sparging with a non-reactive gas, such as nitrogen, argon, or helium. By deoxidizing the flowable copper precursor, it is possible to eliminate factors that reduce the properties of copper-selenide nanoparticles during the flow process. It will be noted that incorporation of a solvent in addition to the ligand may provide a particular advantage in flow synthesis of copper-selenide nanoparticles, where dilution of the reaction system is a viable strategy to avoid clogging.

At 40 a flowable selenium precursor is formed by dissolving and/or suspending an appropriate selenium starting material—e.g., elemental black selenium—in a liquid. By inference, other selenium allotropes may also be used. In some examples, the liquid component of the flowable selenium precursor may be the same as the liquid component of the flowable copper precursor. As a more specific example, the liquid may include an amine ligand capable of binding to the selenium starting material to form a soluble complex. In other examples, the liquid component of the flowable selenium precursor may differ somewhat from the liquid component of the flowable copper precursor. In some examples, the flowable selenium precursor may be deoxygenated by sparging with a non-reactive gas, such as nitrogen, argon, or helium. By deoxidizing the flowable selenium precursor, it is possible to eliminate factors that reduce the properties of copper-selenide nanoparticles during the flow process.

At 42 a flowable copper-selenium mixture is formed by combining the flowable copper precursor and the flowable selenium precursor. In some examples, the flowable copper-selenium mixture may include 1 molar equivalent of copper (from the flowable copper precursor) for every 1 to 3 molar equivalents of selenium (from the flowable selenium precursor). Furthermore, it is preferable that 0.5 mol or more of the amine ligand is contained in 1 mol equivalent of copper in the flowable copper-selenium mixture. A copper-selenium-amine complex is formed in a flowable copper-selenium mixture by containing 0.5 mol or more of the amine ligand with respect to 1 molar equivalent of copper. The copper-selenium-amine complex exists in the flowable copper-selenium mixture as an aggregate containing copper atoms and selenium atoms in a certain ratio. By passing through a heating unit during the flow process, adjacent copper and selenium in the complex first react with each other in the flowable copper-selenium mixture to cause uniform nucleation and followed by grain growth. Therefore, the composition ratio of the obtained copper-selenide nanoparticles becomes stable, and the copper-selenide nanoparticles having a high peak-to-valley ratio can be obtained. There is no particular upper limit to the amount of amine ligand in the flowable copper-selenium mixture as long as it contains 0.5 or more of amine ligand with respect to 1 molar equivalent of copper. Since the above-mentioned effects can be obtained if there is a sufficient amount of the amount of amine ligand for forming a complex of copper and selenium, the amount of amine ligand with respect to 1 molar equivalent of copper is preferably 50 or less, more preferably 30 or less.

At 44 the flowable copper-selenium mixture is conducted through at least one heating unit. In some examples, the flowable copper-selenium mixture may be conducted through two or more heating units. Further, in some examples, the flowable copper-selenium mixture may be conducted through a microwave unit. Further, in some examples, the flowable copper-selenium mixture may be conducted through a flow heater maintained at a temperature within a range of 220 to 300° C. The heating unit is preferably one in which the conduit is placed in a medium at a controlled temperature. In particular, when the flow heater is, for example, immersed in a bath in which the conduit is maintained at a specified setpoint temperature, the variation in the properties of the resulting copper-selenide nanoparticles is small. Conventionally, in the flow process, a method has been adopted where nucleation and growth of particles are separated by passing through two or more heating units, thereby uniform particles are obtained. However, by using the copper-selenium-amine complex as described above in the flowable copper-selenium mixture, the particles uniformly nucleate and grow even in one heating unit, thereby uniform copper-selenide nanoparticles can be obtained as a result. Obtaining high quality copper-selenide nanoparticles with fewer steps is an industrial advantage.

At 46 the solution containing copper-selenide nanoparticles is combined with an excess amount of a deoxygenated, higher-polarity solvent in order to precipitate air-stable nanoparticles of copper selenide. The nanoparticles are isolated in an oxygen-depleted environment, which is believed to reduce the level of impurities in the product. The inventors herein have noted that aerobic workup of copper-selenide nanoparticles typically results in a color change indicative of product degradation or of the formation of unwanted side-products. That is, it was found that the thus-obtained copper-selenide nanoparticles have a better air stability and a high peak-to valley ratio, by performing, in an anaerobic atmosphere, not only the synthesis of copper-selenide nanoparticles but also the isolation step that is performed after the growth of the nanoparticles has already been completed. In some examples, the higher-polarity solvent may include absolute ethanol, which is freely miscible with 1-octadecene and with other solvents that readily dissolve ligand-encapsulated semiconductor nanoparticles. Other higher-polarity solvents are also envisaged.

Figure 3:
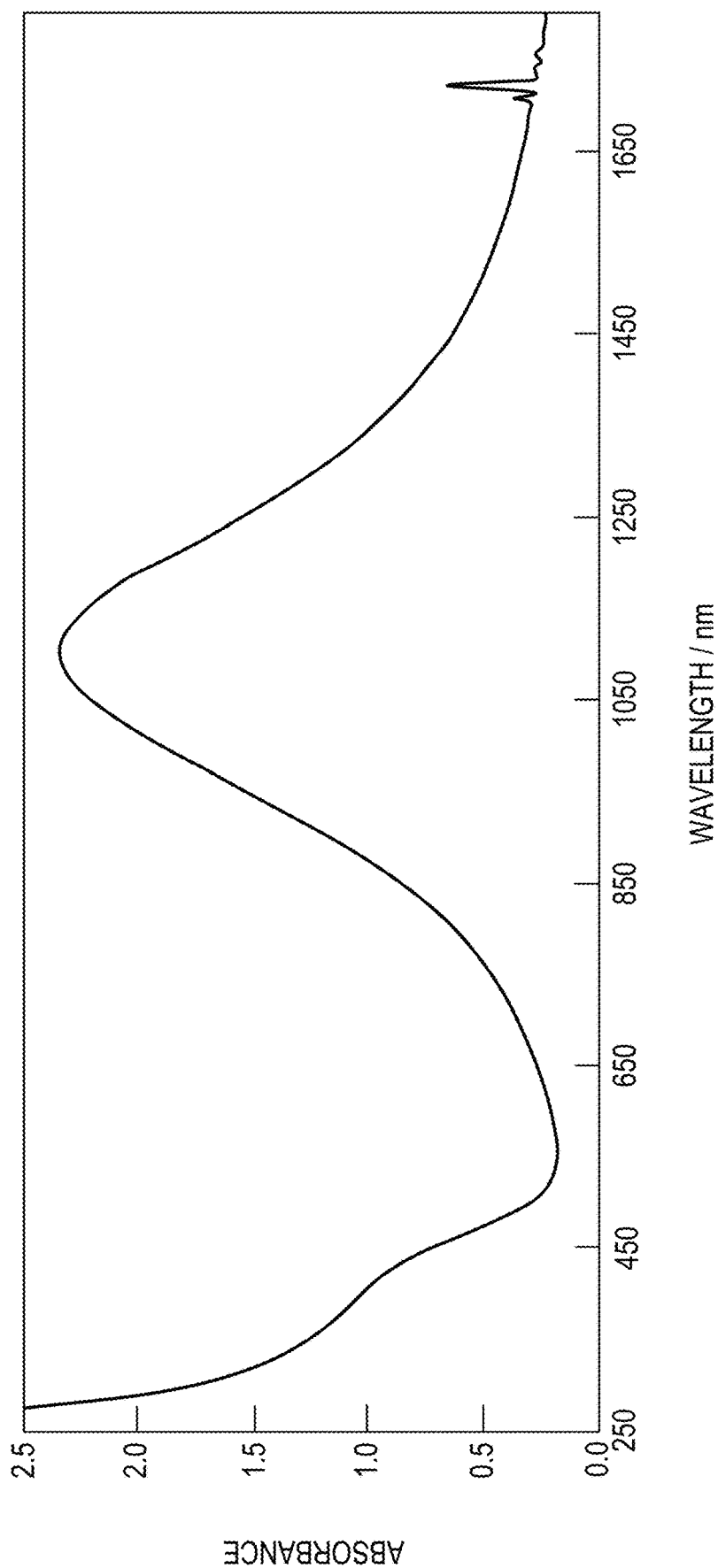
FIG. 3 shows an example UV-visible absorption spectrum of a solution of copper-selenide nanoparticles prepared according to the method of FIG. 2.

FIG. 3 shows an example UV-visible absorption spectrum of an n-hexane solution of copper-selenide nanoparticles prepared according to the method of FIG. 2. The spectrum reveals an exciton absorption with an absorbance maximum ($\lambda_{max}$) at 1096 nm. The exciton absorption has a half-width at half-maximum (HWHM) of 114 milli-electron-volts (meV) and a peak-to-valley ratio (PVR) of 12.5. In other examples, the exciton absorption may have an absorbance maximum between 900 and 1200 nm. In more particular examples, the absorbance maximum may lie between 940 and 1100 nm.

Figure 4:
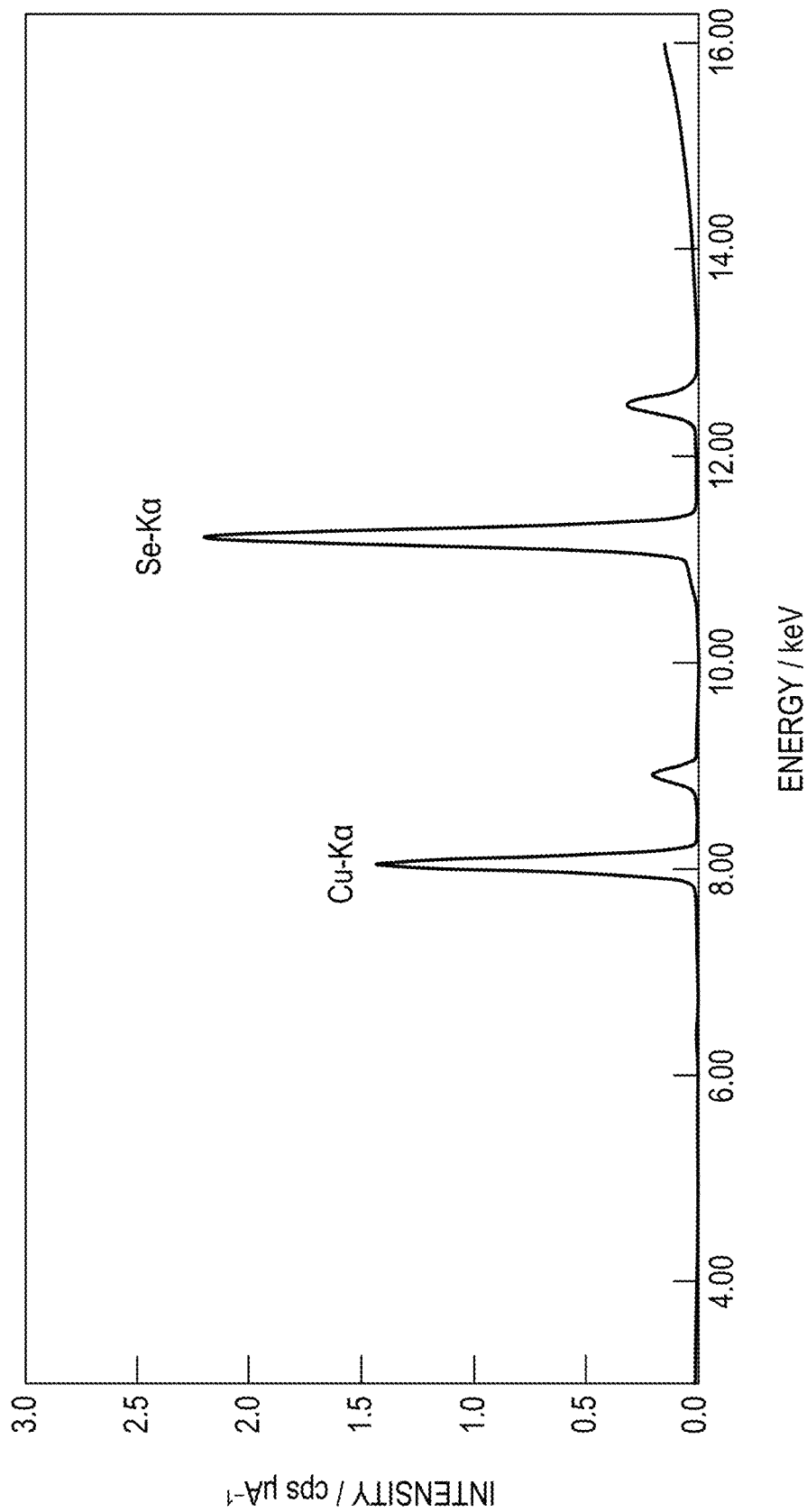
FIG. 4 shows an example x-ray fluorescence spectrum of copper-selenide nanoparticles prepared according to the method of FIG. 2.

FIG. 4 shows an example energy-dispersive x-ray fluorescence (XRF) spectrum of copper selenide-nanoparticles prepared according to the method of FIG. 2. The solution-phase specimen was prepared by dissolving the nanoparticles in an n-hexane solution under a helium atmosphere. The sample was irradiated and data collected for about 200 seconds. The spectrum reveals a copper K$\alpha$ peak at 8.05 kilo-electron-volts (keV) and a selenium K$\alpha$ peak at 11.22 keV. The area ratio of the copper K$\alpha$ peak to the selenium K$\alpha$ peak is 1.75.

Figure 5A:
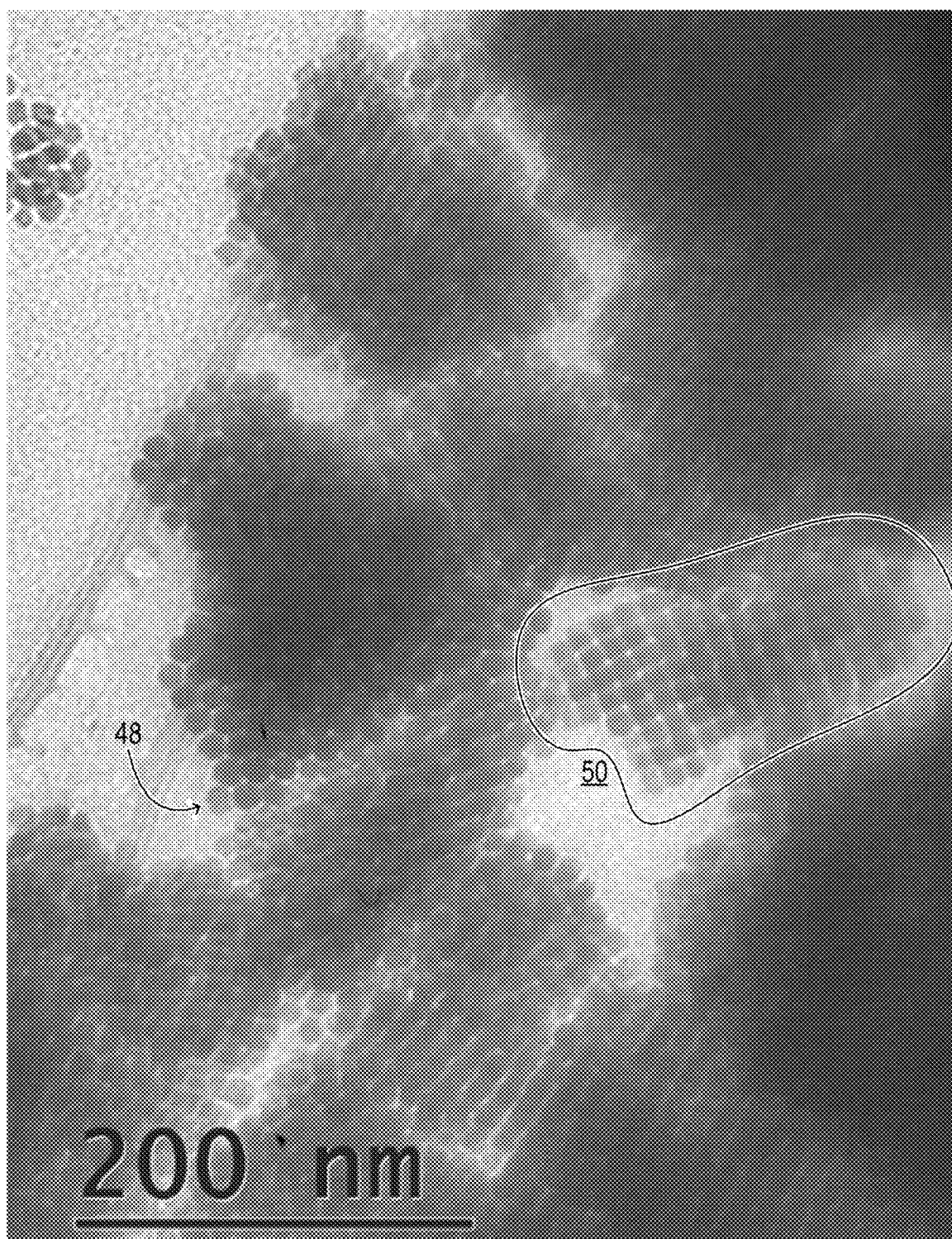
FIG. 5A show example transmission electron microscopy (TEM) micrographs of copper-selenide nanoparticles prepared according to the method of FIG. 2.
Figure 5B:
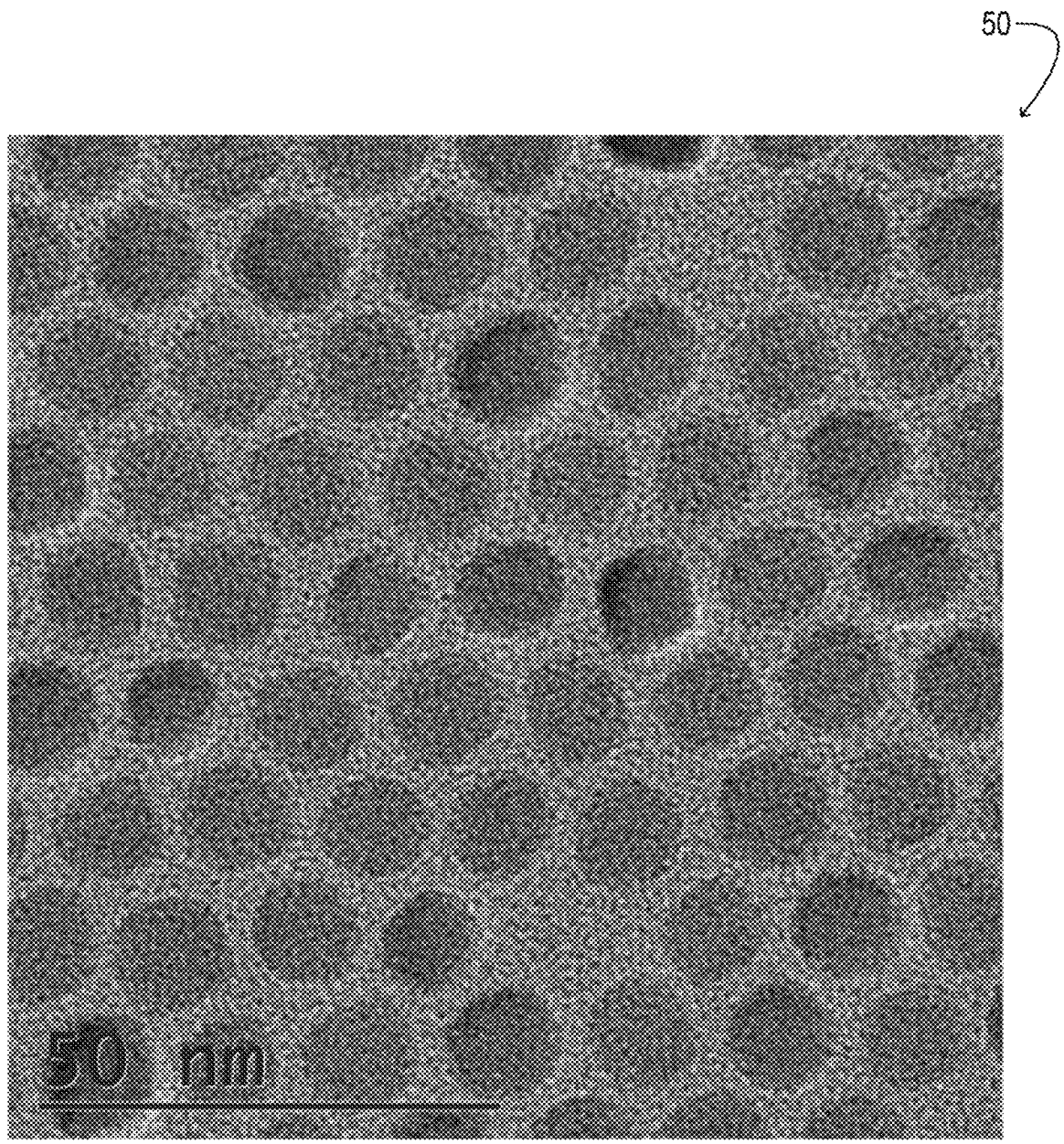
FIG. 5B is an enlarged photograph of a two-dimensional superlattice of copper-selenide particles shown in FIG. 5A.

FIGS. 5A and 5B show example transmission electron microscopy (TEM) micrographs of copper-selenide nanoparticles prepared according to the method of FIG. 2. The micrograph specimens were obtained by depositing the nanoparticles onto lacey carbon TEM grids from solutions of the nanoparticles in n-hexane. FIG. 5A reveals numerous individual copper-selenide nanoparticles 48 between 10 and 11 nanometers in diameter. The size distribution among the nanoparticles is sufficiently narrow as to allow the nanoparticles to self-assemble into a series of two-dimensional superlattices 50. FIG. 5B provides an expanded view of one of the superlattices.

Figure 6A:
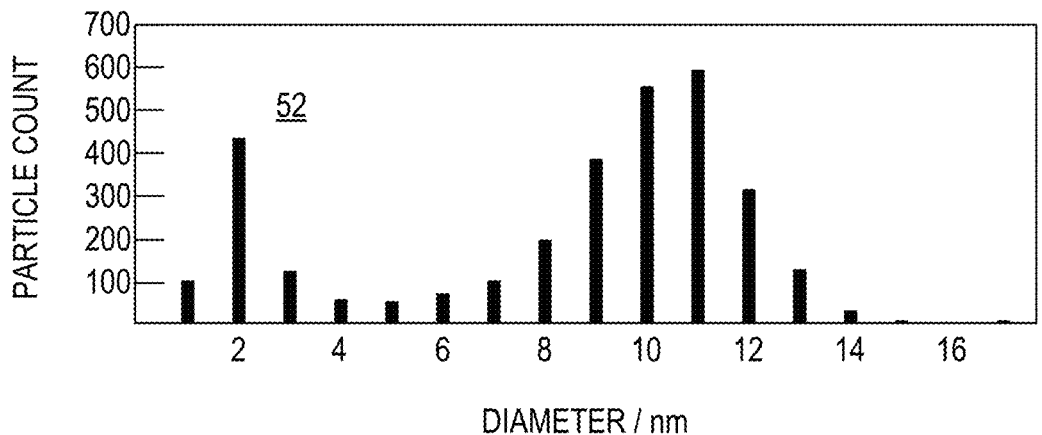
FIGS. 6A, 6B and 6C show example particle-size histograms of copper-selenide nanoparticles prepared according to the method of FIG. 2, using the reactor system of FIG. 1. The histograms are based on particle-size measurements using TEM micrographs such as those of FIGS. 5A and 5B.
Figure 6B:
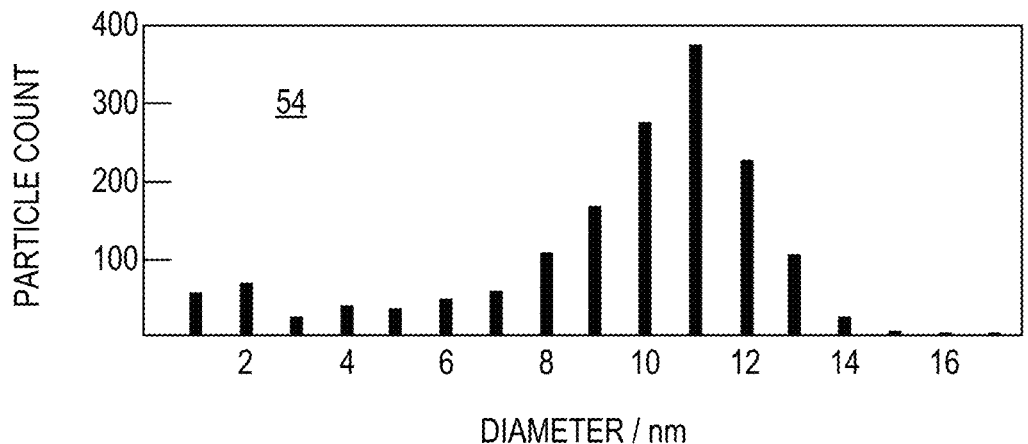
Figure 6C:
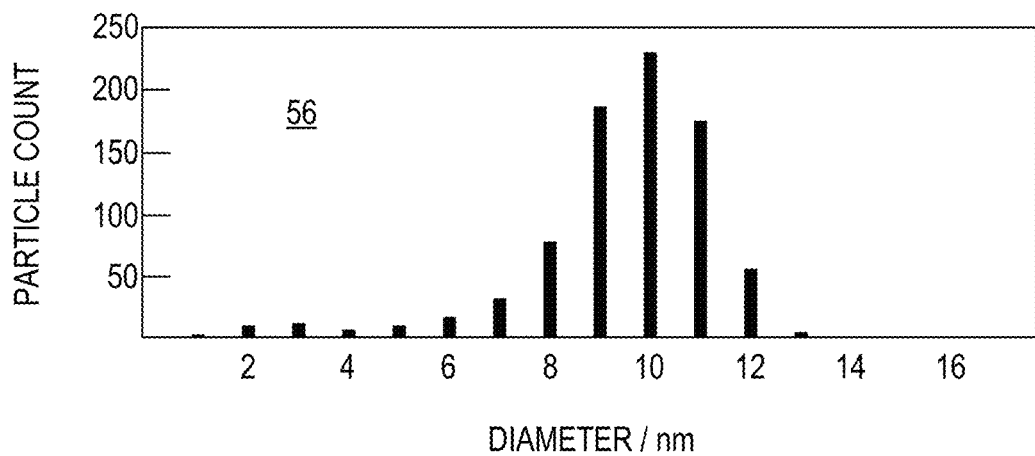

FIGS. 6A, 6B and 6C show example particle-size histograms of copper-selenide nanoparticles prepared according to the method of FIG. 2, using the segmented continuous-flow reactor system of FIG. 1. The histograms are based on particle-size measurement using TEM micrographs such as those of FIGS. 5A and 5B. Histogram 52 reflects the particle-size distribution of nanoparticles collected from the discharge of reactor system 10 over a 20-minute collection interval at a reactant flow rate of 6 mL/minute. Histograms 54 and 56 reflect the particle-size distributions of nanoparticles collected during two different subintervals of the 20-minute collection interval. In particular, the distribution for histogram 54 was collected during the 6.67-to-10 minute subinterval, and the distribution for histogram 56 was collected during the 16.67-to-20 minute subinterval. These results show that particle-size distributions obtained using a segmented continuous-flow reactor system may vary within the collection interval, and that the collection time can be a useful control parameter for obtaining a desired particle-size distribution.

FIG. 7 shows aspects of an example film-coated structure 58 that may be assembled using copper-selenide nanoparticles prepared according to the method of FIG. 2. The film-coated structure includes an electronically conductive substrate 60. In some examples, the electronically conductive substrate may comprise a transparent optical flat, such as glass or quartz, supporting a thin coating 62 of a degenerately doped semiconductor, such as indium-tin oxide (ITO). The film-coated structure includes a plurality of layers 64 of two-dimensionally close-packed copper-selenide nanoparticles 48 arranged on the electronically conductive substrate. The plurality of layers includes a bridging ligand 66 capable of bridging adjacent layers of the plurality of layers. The term 'bridging ligand' is used herein to denote any ligand having two or more donor sites arranged such that different donor sites may bind to different acceptor sites. In film-coated structure 58, the bridging ligand also bridges at least one of the plurality of layers—e.g., base layer 64B—to the electronically conductive substrate. In some examples, the bridging ligand may include an $\alpha$, $\omega$-difunctional or $\mu^2$ ligand, as known in the art of coordination chemistry. More particular examples of the bridging ligand include $\alpha$, $\omega$-dithiols, such as 1,2-ethanedithiol and 1,3-propanedithiol.

Typically, the plurality of layers 64 of two-dimensionally close-packed copper-selenide nanoparticles may include a plurality of defect sites 68—i.e., 'surface states'—that support charge-carrier transport through the plurality of layers. In the illustrated example, the plurality of layers includes a plurality of void areas 70. In order to enhance the performance of film-coated structure as an infrared detector, the plurality of void areas may be filled by a dielectric 72. Suitable dielectrics include aluminum oxide and zirconium oxide, for example.

Figure 8:
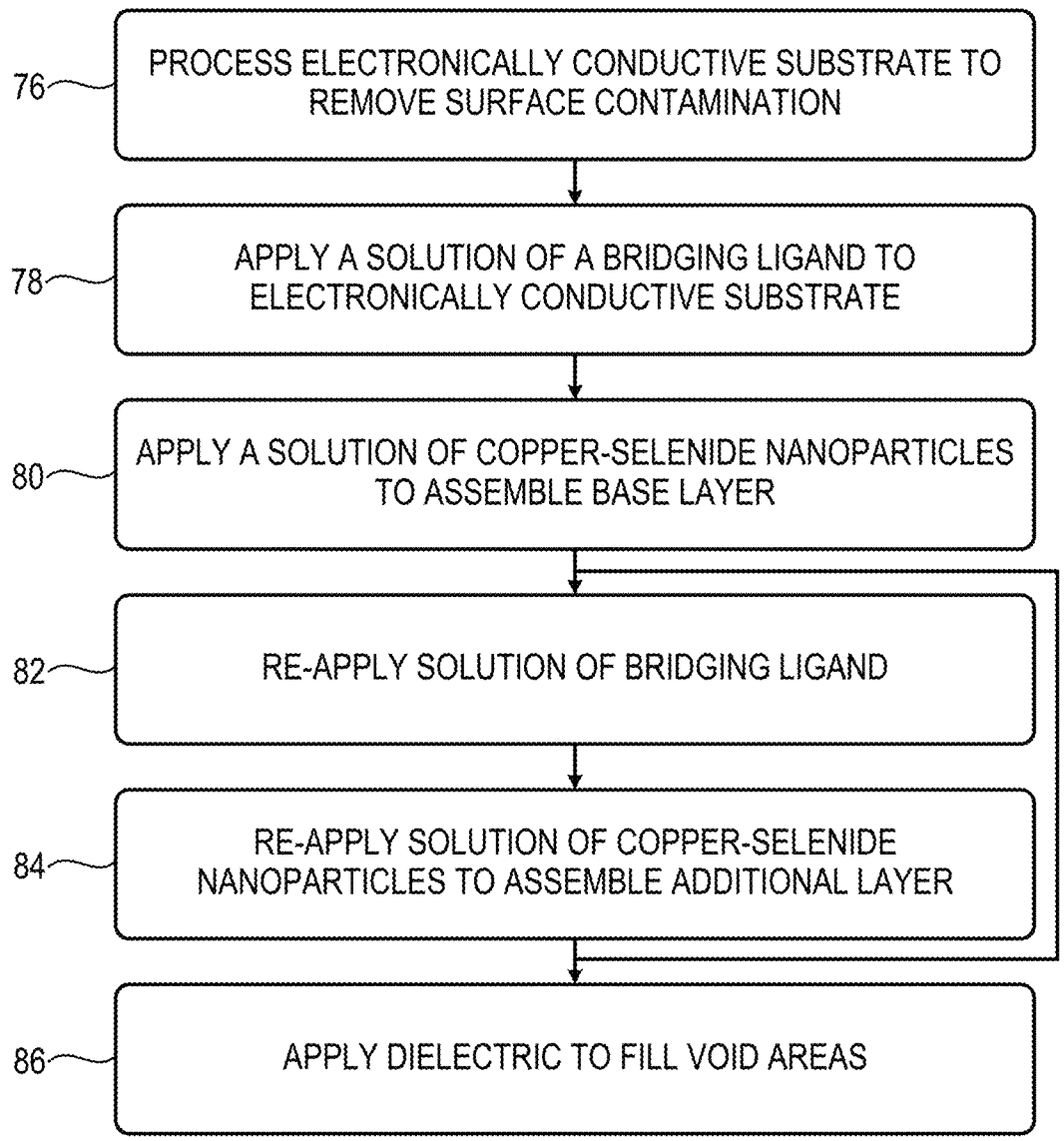
FIG. 8 illustrates an example process to make a film-coated structure as shown in FIG. 7.

FIG. 8 illustrates an example process 74 to make a film-coated structure as shown in FIG. 7. At 76 of process 74, an electronically conductive substrate is processed to remove surface contamination. Suitable processing modes include mechanical and/or chemical etching, application of detergents and/or solvents, and heat treatment, for example. At 78 a solution of a bridging ligand in a non-coordinating solvent is applied to the electronically conductive substrate. The mode of application of the solution is not particularly limited. Dip coating, spray coating, and/or doctor-blade techniques may be used, for example. At 80 an initial application of a solution of copper-selenide nanoparticles in a non-coordinating solvent is applied to the electronically conductive substrate, to assemble base layer 64B (referring again to the film-coated structure of FIG. 7). The mode of application of the solution is not particularly limited. At this stage of process 74, the bridging ligand may displace the exchangeable ligand assembled on the exterior of the copper-selenide nanoparticles during synthesis.

At 82 a solution of the bridging ligand is re-applied to the electronically conductive substrate in order to support an additional layer of copper-selenide nanoparticles. At 84 an additional copper-selenide nanoparticle layer is formed by re-applying the copper-selenide nanoparticle solution. Steps 82 through 84 may now be repeated so as to assemble a plurality of layers of copper-selenide nanoparticles of any desired thickness. When the desired number of layers are assembled, the film-coated substrate may be dried and, at 86, placed in an atomic-layer deposition (ALD) chamber, where a dielectric is deposited in order to fill the void areas of the film-coated structure.

It will be understood that the configurations and/or approaches described herein are exemplary in nature, and that these specific embodiments or examples are not to be construed in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various configurations, properties, functions, processes, acts, and other features disclosed herein, as well as any and all equivalents.

The method for producing copper-selenide nanoparticles according to the embodiment of the present invention includes the following constitutions.

(1) A method for producing copper-selenide nanoparticles by flow process, the method comprising:
forming a flowable copper precursor by combining a copper starting material and a ligand;
forming a flowable selenium precursor by suspending a selenium starting material in a liquid;
forming a flowable copper-selenium mixture by combining the flowable copper precursor and the flowable selenium precursor, the flowable copper-selenium mixture including a lower-polarity solvent;
forming a solution containing copper-selenide nanoparticles by conducting the flowable copper-selenium mixture through at least one heating unit; and
isolating the nanoparticles of copper selenide in an oxygen-depleted environment, including combining the flowable copper-selenium mixture and a deoxygenated, higher-polarity solvent to precipitate the nanoparticles of copper selenide, the higher-polarity solvent being more polar than the lower-polarity solvent.

(2) The method of (1) further comprising appending a segment of an immiscible, non-reacting fluid to each of a series of fixed-length segments of the flowable copper-selenium mixture, to form a segmented flow of the flowable copper-selenium mixture, wherein conducting the flowable copper-selenium mixture through the at least one heating unit includes flowing the segmented flow through the at least one heating unit.

(3) The method of (1) wherein combining the copper starting material and the ligand includes combining with the lower-polarity solvent.

(4) The method of (1) wherein the liquid includes the lower-polarity solvent.

(5) The method of (1) wherein the at least one heating unit includes a conduit arranged in a controlled-temperature medium.

(6) The method of (1) wherein the ligand comprises an amine ligand.

(7) The method of (6) wherein in the flowable copper-selenium mixture, 0.5 mol or more of the amine ligand is contained in 1 mol equivalent of copper.

(8) The method of (1) wherein the deoxygenated higher-polarity solvent is sparged with a non-reacting gas to remove dissolved oxygen.

(9) The method of (1) wherein each of the copper precursor and the selenium precursor are sparged with a non-reacting gas to remove dissolved oxygen.

(10) The method of (1) wherein the copper starting material includes a substantially anhydrous copper (I) salt, and wherein the selenium starting material includes elemental selenium.

(11) The method of (1) wherein the lower-polarity solvent includes 1-octadecene, and wherein the higher-polarity solvent includes absolute ethanol.

The aggregated bodies of copper-selenide nanoparticles according to the embodiment of the present invention includes the following constitutions.

(12) An air-stable aggregated bodies of copper-selenide nanoparticles comprise copper-selenide nanoparticles which are encapsulated by a ligand, and exhibit an exciton absorption with an absorbance maximum between 900 and 1200 nanometers.

(13) The aggregated bodies of (12) wherein the ligand comprises an exchangeable ligand.

(14) (The aggregated bodies of (12) wherein the ligand comprises an amine ligand.

(15) (The aggregated bodies of (12) wherein the absorbance maximum has a peak-to-valley ratio of 10 or greater.

(16) The aggregated bodies of (12) wherein the copper-selenide nanoparticles are crystallized in a two-dimensionally close-packed array.

The copper-selenide nanoparticles according to the embodiment of the present invention includes the following constitutions.

(17) Copper-selenide nanoparticles having an absorbance maximum between 900 and 1200 nanometers and the absorbance maximum has a peak-to-valley ratio of 10 or greater.

(18) The copper-selenide nanoparticles of (17), which are encapsulated by a ligand.

(19) The copper-selenide nanoparticles of (18) wherein the ligand comprises an exchangeable ligand.

The film-coated structure according to the embodiment of the present invention includes the following constitutions.

(20) A film-coated structure comprising:
an electronically conductive substrate; and
a plurality of layers of two-dimensionally close-packed copper-selenide nanoparticles arranged on the electronically conductive substrate, the plurality of layers including a ligand bridging adjacent layers of the plurality of layers and bridging at least one of the plurality of layers to the electronically conductive substrate.

(21) The film-coated structure of (20) wherein the plurality of layers includes a plurality of defect sites that support charge-carrier transport through the plurality of layers.

(22) The film-coated structure of (20) wherein the plurality of layers includes a plurality of void areas filled by a dielectric.

(23) The film-coated structure of (22) wherein the dielectric includes aluminum oxide.

(24) The film-coated structure of (23) wherein the aluminum oxide is deposited via atomic-layer deposition.

(25) The film-coated structure of (20) wherein the film-coated structure is configured as a near-infrared sensor.

(26) A film-coated structure containing the copper-selenide nanoparticles according to (17).

EXAMPLES

Experimental Example 1

Preparation of Precursor Solution

Anhydrous copper (I) chloride was dissolved in a dispersion medium in which oleylamine and 1-octadecene were mixed at a ratio of 1:1 to obtain a flowable copper precursor. Next, selenium and 1-octadecene were mixed to obtain a flowable selenium precursor solution. The obtained flowable copper precursor, flowable selenium precursor, and oleylamine are mixed, and flowable copper-selenium mixture was adjusted so that the molar ratio of copper:selenium:oleylamine was 1:1:12.

Preparation of Copper-selenide Nanoparticles by Flow Process

The obtained flowable copper-selenium mixture was flowed through a conduit at 6 mL/min, and $N_2$ gas was introduced to obtain a segment flow. After passing through a microwave unit whose frequency was set to 2 kW, it was passed through an oven set at 220° C. to obtain a fluid containing copper-selenide nanoparticles. In an anaerobic atmosphere, an excess amount of deoxygenated absolute ethanol was added to the fluid containing the copper-selenide nanoparticles to precipitate the copper-selenide nanoparticles.

Experimental Example 2-Experimental Example 5

$N_2$ gas was sparged in the flowable copper precursor solution prepared in Experimental Example 1 to deoxidize it. Further, $N_2$ gas was sparged in the flowable selenium precursor solution prepared in Experimental Example 1 to deoxidize it. Using both precursor solutions from which dissolved oxygen had been removed, a flowable copper-selenium mixture having the same copper:selenium:oleylamine molar ratio as in Experimental Example 1 was obtained.

Copper-selenide nanoparticles were prepared in the same manner as in Experimental Example 1 under the conditions for producing nanoparticles by the flow process.

The above procedure is repeated 4 times, and they are shown as the values of Experimental Example 2 to Experimental Example 5, respectively.

By deoxidizing the precursor solution as well, copper-selenide nanoparticles having a higher peak-to-valley ratio were obtained.

Experimental Example 6

The flowable copper precursor solution from which dissolved oxygen was removed, the flowable selenium precursor solution from which dissolved oxygen was removed, and oleylamine prepared in Experimental Example 2 were mixed to obtain flowable copper-selenium mixture. The flowable copper-selenium mixture was adjusted to have a copper:selenium:oleylamine molar ratio of 1:1:20 in the flowable copper-selenium mixture.

Copper-selenide nanoparticles were prepared in the same flow process conditions as in Experimental Example 1.

Experimental Example 7-Experimental Example 9

The flowable copper precursor solution from which dissolved oxygen was removed, and the flowable selenium precursor solution from which dissolved oxygen was removed prepared in Experimental Example 2 were mixed in the same ratio as in Experimental Example 2.

Copper-selenide nanoparticles were produced in the same manner as in Experimental Example 2 except that the flow heater was changed from an oven (convection heating) to immersion (conduction heating) when producing nanoparticles by continuous flow.

The above procedure is repeated 3 times, and they are shown as the values of Experimental Example 7 to Experimental Example 9, respectively.

By using the immersion method for the flow heater, the variation in the characteristics of the copper-selenide nanoparticles obtained in Experimental Example 7 to 9 was reduced.

Experimental Example 10 and Experimental Example 11

The flowable copper precursor solution from which dissolved oxygen was removed, and the flowable selenium precursor solution from which dissolved oxygen was removed prepared in Experimental Example 2 were mixed in the same ratio as in Experimental Example 6. Copper-selenide nanoparticles were produced under the same conditions as in Experimental Example 7 to 9.

The above procedure is repeated twice, and they are shown as the values of Experimental Example 10 and Experimental Example 11, respectively.

Experimental Example 12

Copper-selenide nanoparticles were produced in the same manner as in Experimental Example 7 except that the frequency of the microwave unit was set to 0 kW.

Experimental Example 13

Copper-selenide nanoparticles were produced in the same manner as in Experimental Example 7 except that the frequency of the microwave unit was set to 0 kW and the temperature inside the flow heater was set to 240° C.

Experimental Example 14

Copper-selenide nanoparticles were produced in the same manner as in Experimental Example 7 except that the flowable copper-selenium mixture was run through the conduit at 8 mL/min and the frequency of the microwave unit was set to 0 kW.

Experimental Example 15

Copper-selenide nanoparticles were produced in the same manner as in Experimental Example 7 except that the flowable copper-selenium mixture was run through the conduit at 8 mL/min, the frequency of the microwave unit was set to 0 kW, and the temperature inside the flow heater was set to 240° C.

As shown in Experimental Example 12 to 15, copper-selenide nanoparticles having a high PVR value were obtained without separating the nucleation zone and the grain growth zone.

Experimental Example 16

Copper-selenide nanoparticles were produced in the same manner as in Experimental Example 7 except that the molar ratio of copper:selenium:oleylamine in the flowable copper-selenium mixture was 1:1:0.6.

Experimental Example 17

Copper-selenide nanoparticles were produced in the same manner as in Experimental Example 7 except that instead of adding an excessive amount of deoxidized anhydrous ethanol to the fluid containing copper-selenide nanoparticles, air was purged to create an aerobic atmosphere.

Experimental Example 18

Copper-selenide nanoparticles were produced in the same manner as in Experimental Example 7 except that the molar ratio of copper:selenium:oleylamine in the flowable copper-selenium mixture was 1:1:0.3.

Evaluation

The UV-visible absorption spectrum of the copper-selenide nanoparticles prepared in Experimental Example 1 to 18 was measured in an air environment to determine the maximum absorbance of exciton absorption ($\lambda_{max}$), peak-to-valley ratio (PVR), and full width at half maximum (HWHM). The results are shown in Table 1.

TABLE 1

| Experimental Example | Precursor condition amine ligand/ Cu [molar ratio] | Flow process conditions | | | | copper-selenide particles properties | | |
|---|---|---|---|---|---|---|---|---|
| | | heating unit 1 | heating unit 2 | | | | | |
| | | flow rate/ [mL/min] | microwave power/ [kW] | temperature in the media [° C.] | heat transfer form | absorption wavelength/ $\lambda$max | PVR | HWHM/ meV |
| 1 | 12 | 6 | 2 | 220 | oven | 1072 | 9.4 | 116 |
| 2 | 12 | 6 | 2 | 220 | oven | 1096 | 12.5 | 114 |
| 3 | 12 | 6 | 2 | 220 | oven | 1076 | 11.9 | 116 |
| 4 | 12 | 6 | 2 | 220 | oven | 1112 | 11.3 | 119 |
| 5 | 12 | 6 | 2 | 220 | oven | 1086 | 11.4 | 116 |
| 6 | 20 | 6 | 2 | 220 | oven | 1071 | 10.5 | 116 |
| 7 | 12 | 6 | 2 | 220 | immersion | 1083 | 13.5 | 109 |
| 8 | 12 | 6 | 2 | 220 | immersion | 1067 | 13.6 | 112 |
| 9 | 12 | 6 | 2 | 220 | immersion | 1065 | 13.4 | 113 |
| 10 | 20 | 6 | 2 | 220 | immersion | 1058 | 12.9 | 114 |
| 11 | 20 | 6 | 2 | 220 | immersion | 1052 | 12.3 | 111 |
| 12 | 12 | 6 | 0 | 220 | immersion | 1070 | 13.6 | 110 |
| 13 | 12 | 6 | 0 | 240 | immersion | 1052 | 12.2 | 108 |
| 14 | 12 | 8 | 0 | 220 | immersion | 1028 | 10.0 | 116 |
| 15 | 12 | 8 | 0 | 240 | immersion | 1039 | 12.8 | 109 |
| 16 | 0.6 | 6 | 2 | 220 | immersion | 1069 | 10.0 | 119 |
| 17 | 12 | 6 | 2 | 220 | immersion | 1092 | 3.59 | 140 |
| 18 | 0.3 | 6 | 2 | 220 | immersion | 1063 | 4.12 | 228 |

In Experimental Examples 1 to 6, the flow heater conduit was arranged in the oven controlled to operate at the specified set temperature. Moreover, in Experimental Examples 7 to 18, the flow heater conduit was immersed in a tank whose temperature was controlled so as to maintain the specified set temperature.

REFERENCE CHARACTERS LIST 10 reactor system
12A, 12B precursor reservoir
12D diluent reservoir
12S solvent reservoir
14 non-reacting gas
16 multi-channel pump
18 premix vessel
20 pump
22 preheater
24 segmentation unit
26 microwave unit
28 flow heater
30A, 30B, 30C temperature sensor
32 cooler
34 collection unit
36 process
48 copper-selenide nanoparticles
50 two-dimensional superlattices
52, 54, 56 histogram
58 film-coated structure
60 electronically conductive substrate
62 coating
64 plurality of layers
64B base layer
66 bridging ligand
68 defect site
70 void area
72 dielectric
74 process

The invention claimed is:
1. A method for producing copper-selenide nanoparticles by flow process, the method comprising:
forming a flowable copper precursor by combining a copper starting material and a ligand;
forming a flowable selenium precursor by suspending a selenium starting material in a liquid;
forming a flowable copper-selenium mixture by combining the flowable copper precursor and the flowable selenium precursor, the flowable copper-selenium mixture including a lower-polarity solvent;
forming a segmented flow of the flowable copper-selenium mixture by appending a segment of an immiscible, non-reacting fluid to each of a series of fixed-length segments of the flowable copper-selenium mixture;
forming a solution containing copper-selenide nanoparticles by conducting the segmented flow of the flowable copper-selenium mixture through at least one heating unit; and
isolating the nanoparticles of copper selenide in an oxygen-depleted environment, including combining the solution containing copper-selenide nanoparticles and a deoxygenated, higher-polarity solvent to precipitate the nanoparticles of copper selenide, the higher-polarity solvent being more polar than the lower-polarity solvent.

2. The method of claim 1 wherein combining the copper starting material and the ligand includes combining with the lower-polarity solvent.

3. The method of claim 1 wherein the liquid includes the lower-polarity solvent.

4. The method of claim 1 wherein the at least one heating unit includes a conduit arranged in a controlled-temperature medium.

5. The method of claim 1 wherein the ligand comprises an amine ligand.

6. The method of claim 5 wherein in the flowable copper-selenium mixture, 0.5 mol or more of the amine ligand is contained in 1 mol equivalent of copper.

7. The method of claim 1 wherein the deoxygenated higher-polarity solvent is sparged with a non-reacting gas to remove dissolved oxygen.

8. The method of claim 1 wherein each of the copper precursor and the selenium precursor are sparged with a non-reacting gas to remove dissolved oxygen.

* * * * *